United States Patent [19]

Harvey et al.

[11] 4,375,878
[45] Mar. 8, 1983

[54] SPACE SATELLITE WITH AGILE PAYLOAD ORIENTATION SYSTEM

[75] Inventors: Thomas J. Harvey, Los Altos Hills; Gary C. Gibson, Los Gatos, both of Calif.

[73] Assignee: Lockheed Missiles & Space Company, Inc., Sunnyvale, Calif.

[21] Appl. No.: 201,560

[22] Filed: Oct. 28, 1980

[51] Int. Cl.³ .............................................. B64G 1/66
[52] U.S. Cl. ................................ 244/158 R; 244/165; 74/5.22; 248/550; 248/652; 343/DIG. 2
[58] Field of Search ................ 244/158, 159, 164–171, 244/176, 191; 343/DIG. 2, 708, 757, 882, 765, 766; 74/5.22, 5 R, 5.34; 248/550, 652

[56] References Cited

U.S. PATENT DOCUMENTS

| 2,752,792 | 7/1956 | Draper et al. | 244/191 |
| 2,907,031 | 9/1959 | Meredith | 343/757 |
| 3,448,272 | 6/1969 | Slater | 244/171 |
| 3,490,281 | 1/1970 | Ainsworth | 244/5.34 |
| 3,731,544 | 5/1973 | Acker et al. | 74/5.22 |
| 3,813,067 | 5/1974 | Mork | 244/165 |
| 4,052,654 | 10/1977 | Kramer et al. | 244/165 |
| 4,071,211 | 1/1978 | Muhlfelder et al. | 244/171 |
| 4,136,844 | 1/1979 | Maudal | 244/165 |
| 4,260,942 | 4/1981 | Fleming | 244/165 |

Primary Examiner—Galen L. Barefoot
Attorney, Agent, or Firm—John J. Morrissey

[57] ABSTRACT

An agile payload orientation system for a space satellite comprises a three-axis gimbal (30) for coupling an appended body (20) containing the payload (24, 25, 26, 27) to a main body (10) of the satellite. The appended body (20) also contains moment control gyroscopes (29), which are responsive to external command for changing the orientation of the appended body (20) relative to an inertial reference. The gimbal (30) comprises three separate torquer-resolver units (31, 32, 33), which are connected to each other in series so that their axes are mutually orthogonal to each other and coincide at a single point (34) located at the center of mass of the appended body (20). Since the center of mass of the appended body (20) does not move when the appended body (20) is rotated about the axis of any of the torquer-resolver units (31, 32, 33), a change in orientation of the appended body (20) can be made without disturbing the orientation of the main body (10).

2 Claims, 4 Drawing Figures

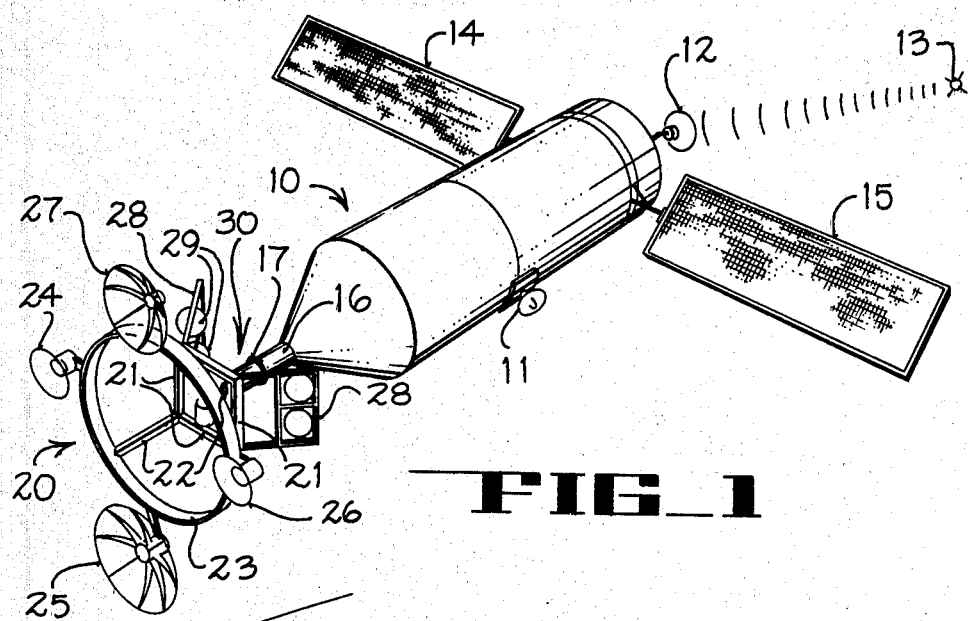
FIG_1
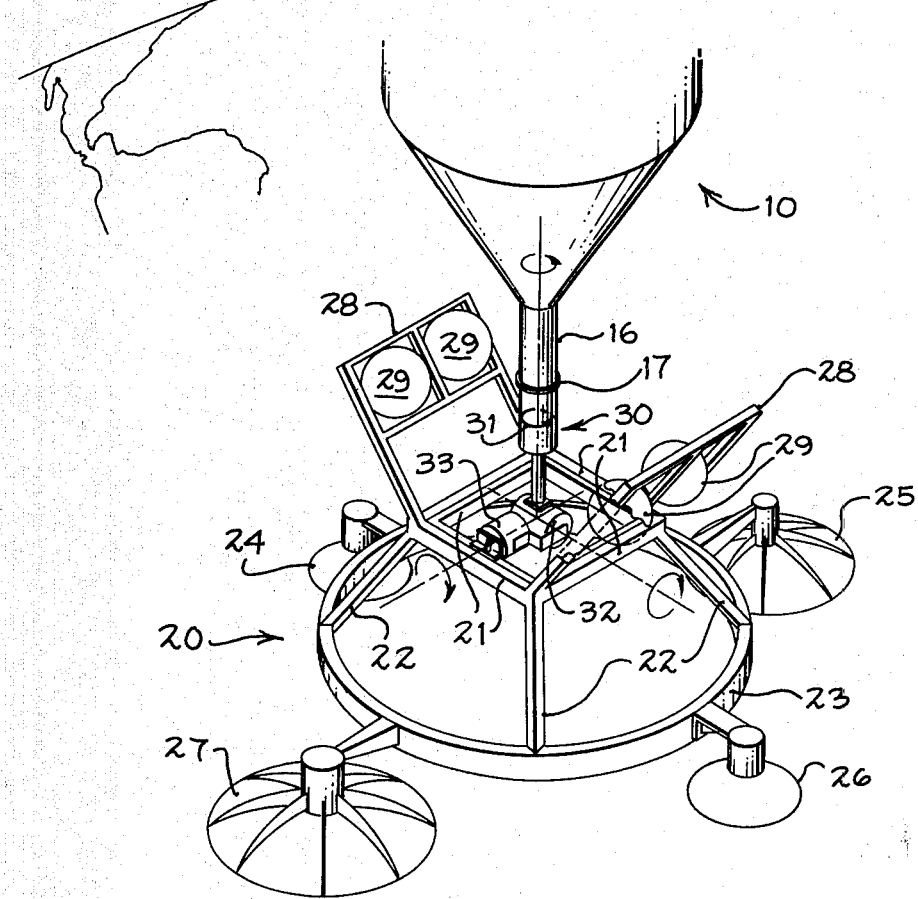
FIG_2

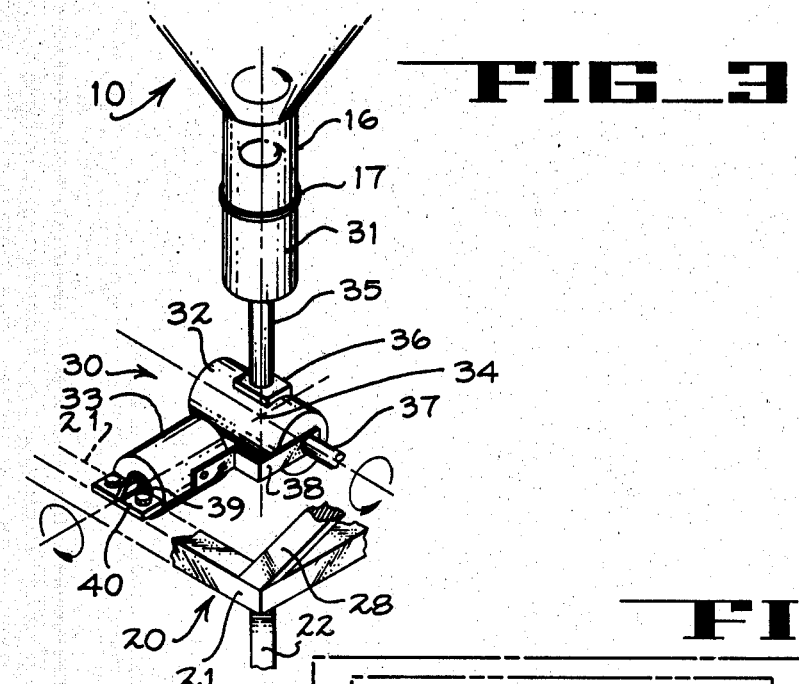
FIG_3
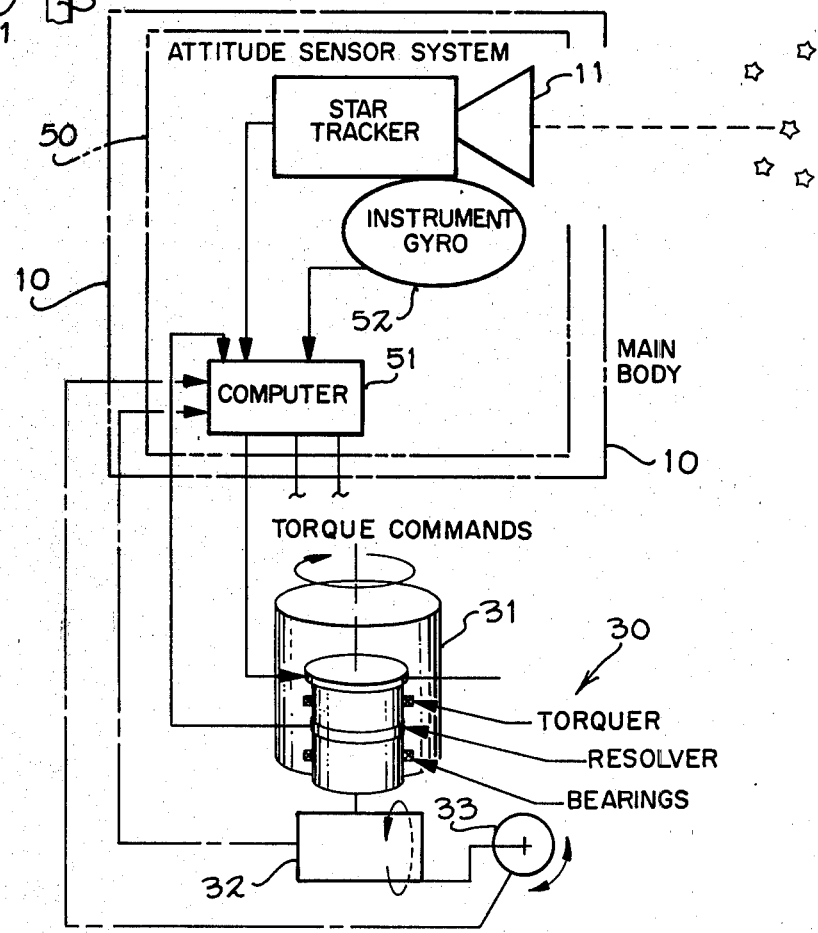
FIG_4

SPACE SATELLITE WITH AGILE PAYLOAD ORIENTATION SYSTEM

BACKGROUND OF THE INVENTION

1. Field of the Invention

This invention pertains generally to space satellites, and particularly to payload orientation systems for space satellites.

2. Description of Prior Art

Proposed space satellite missions require a payload orientation system for maneuvering the payload of the satellite rapidly on command without disturbing the orientation of the main body of the satellite. Agility of the satellite payload is especially important in tracking fast-moving targets or for shifting surveillance rapidly from one target to another.

It has been proposed to support the payload of a satellite on a separate body appended to the main body of the satellite by an articulating joint, so that the orientation of the payload can be changed without having to maneuver the main body. However, until the present invention, no technique had been devised for changing the orientation of an appended body containing the satellite payload without concomitantly transferring momentum to the main body of the satellite.

SUMMARY OF THE INVENTION

It is an object of this invention to provide a space satellite having a payload contained in a separate body appended to the main body of the satellite, where the orientation of the appended body can be changed without causing significant transfer of momentum to the main body.

It is likewise an object of this invention to provide an agile payload orientation system for a space satellite, whereby the orientation of the satellite payload can be changed without causing a change in orientation of the main body of the satellite.

It is a particular object of this invention to provide a space satellite having an agile payload contained in a separate body appended to the main body of the satellite by an articulating joint, where the orientation of the payload can be changed on command by transferring momentum internally within the appended body without causing any significant transfer of momentum to the main body of the satellite.

In a space satellite according to the present invention, the payload is contained in a separate body that is appended to the main body of the satellite by a gimbal, which allows the orientation of the appended body to be changed independently of the orientation of the main body. The gimbal of the present invention has bearings that permit rotation of the appended body relative to the main body about three orthogonal axes that intersect substantially at the center of mass of the appended body. A momentum exchange means comprising three or more gyroscopic devices mounted on the appended body permits the appended body to undergo selected rotational motions on command about the three orthogonal gimbal axes, thereby changing the orientation of the appended body without affecting the orientation of the main body.

In the preferred embodiment of the present invention, a means is provided to nullify the effect of any torques applied to the main body of the satellite by changes in orientation of the appended body due to friction at the bearings of the gimbal connecting the appended body to the main body. In particular, an attitude sensor is mounted on the main body to detect incipient motions of the main body relative to an inertial reference that are caused by torques due to frictional forces at the gimbal bearings. The attitude sensor generates electronic signals indicative of the frictional forces at the gimbal bearings; and torquing motors responsive to these signals apply equal and opposite countertorques to the main body to nullify the effect of the frictional forces. In this way, the main body of the satellite is effectively isolated from motions of the appended body. The orientation of the satellite payload can therefore be changed on command without disturbing the orientation of the satellite main body.

BRIEF DESCRIPTION OF THE DRAWING

FIG. 1 is a perspective view of a space satellite according to the present invention.

FIG. 2 is a detailed perspective view of the gimbal and appended body of the space satellite shown in FIG. 1.

FIG. 3 is an enlarged view of the gimbal shown in FIG. 2.

FIG. 4 is a functional diagram of a satellite payload orientation system according to the present invention.

DESCRIPTION OF THE PREFERRED EMBODIMENT

As illustrated in FIGS. 1 and 2, a space satellite according to the present invention comprises a main body 10 and an appended body 20, which are coupled together by a three-axis gimbal 30. The main body 10 typically houses a propulsion motor, and also houses electrical systems for regulation and distribution of power to components of both the main body 10 and the appended body 20. In the usual case, the main body 10 is of generally cylindrical configuration and is more massive than the appended body 20.

The main body 10 preferably includes a star tracker 11 for monitoring the attitude and position of the satellite relative to an inertial reference such as the star Polaris. The main body 10 might also include a communications antenna 12 for transmitting information to and receiving commands from earth, either directly or via a communications satellite 13. The main body 10 might further include foldable solar arrays 14 and 15 mounted on extendible mast structures that can be deployed on command when the satellite achieves a stable orbit. One end 16 of the main body 10 is coupled by conventional means, such as a mating collar 17, to one end of the gimbal 30. The other end of the gimbal 30 is secured to the appended body 20.

The appended body 20 comprises appropriate structural members for supporting the satellite payload. As depicted in FIGS. 1 and 2, the appended body 20 could comprise a symmetrically configured frame having four side members 21 joined together to form a square structure, with four leg members 22 of substantially equal length projecting one from each corner of the square structure. The leg members 22 extend to a generally circular rim member 23 to which they are attached. The plane of the rim member 23 is spaced apart from and generally parallel to the plane of the square structure formed by the side members 21.

Attached to the rim member 23 could be several instruments, as indicated in the drawing by reference numbers 24, 25, 26 and 27, which constitute the principal components of the satellite payload. The nature of the payload instruments depends on the nature of the particular satellite mission. Attached to the square structure formed by the side members 21 are two support members 28 on which conventional moment control gyroscopes 29 are mounted. The gyroscope support members 28 are symmetrically postioned with respect to each other on the square structure. The gyroscopes 29 are responsive to external command by conventional electronic means for changing the orientation of the appended body 20 relative to the inertial reference.

The gimbal 30 is a three-axis gimbal comprising three separate torquer-resolver units 31, 32 and 33, which are connected to each other in series so that their axes are mutually orthogonal to each other and coincide at substantially a single point 34, as shown in detail in FIG. 3. The torquer-resolver units 31, 32 and 33 may be conventional, each comprising a motor and an angular measuring device such as an optical encoder disposed within a housing structure.

Motor shaft 35 of the torquer-resolver unit 31 coincides with the axis of the torquer-resolver unit 31, which coincides with the longitudinal (i.e., cylindrical) axis of the main body 10. The motor shaft 35 is attached to a mating pad 36, which is secured to or integral with the housing structure of the torquer-resolver unit 32. Thus, rotation of the motor shaft 35 of the torquer-resolver unit 31 causes yaw of the appended body 20 about the longitudinal axis of the main body 10 of the satellite.

Motor shaft 37 of the torquer-resolver unit 32 coincides with the axis of the torquer-resolver unit 32, and is orthogonal to the axis of the torquer-resolver unit 31. Two straps 38 (only one of which is seen in the drawing) are attached one at each end of the motor shaft 37, and extend to connections with the housing structure of the torquer-resolver unit 33. Thus, rotation of the motor shaft 37 of the torquer-resolver unit 32 causes pitch of the appended body 20 relative to the main body 10 about the axis of the torquer-resolver unit 32.

The torquer-resolver unit 33 is supported by the straps 38 so that its axis is orthogonal to the axes of the torquer-resolver units 31 and 32, and so that the axes of the torquer-resolver units 31, 32 and 33 all intersect at the common point 34. Motor shaft 39 of the torquer-resolver unit 33 coincides with the axis of the torquer-resolver unit 33, and is connected by a journalled attachment member 40 to one of the sides of the square structure formed by the side members 21 of the appended body 20. Thus, rotation of the motor shaft 39 of the torquer-resolver unit 33 causes roll of the appended body 20 relative to the main body 10 about the axis of the torquer-resolver unit 33.

The positioning of the control moment gyroscopes 29 on their respective support structures 28, and of the payload instruments 24, 25, 26 and 27 on the rim member 23, is such as to locate the center of mass of the appended body 20 substantially at the common point of intersection 34 of the three axes of the gimbal 30. Ordinarily, the various payload instruments 24, 25, 26 and 27 would be configured and positioned symmetrically with respect to each other around the rim member 23. Each moment control gyroscope 29 comprises a motor, a gimbal mounted for rotation by the gyroscope motor about a gimbal axis, and a momentum wheel attached to the gimbal for rotation about a spin axis orthogonal to the gimbal axis. The gimbal of each gyroscope 29 is responsive to external command for rotating the attached momentum wheel about the gimbal axis. A set of appropriate commands to one or more of the gyroscopes 29 thereby permits the appended body 20 to be rotated about a selected one or more of the axes of the gimbal 30.

Since the center of mass of the appended body 20 is located at the point of intersection 34 of the axes of the gimbal 30, the center of mass of the appended body 20 does not move when the appended body 20 is rotated about the gimbal axes. Neglecting the effect of frictional forces at the bearings of the gimbal 30, a change in the orientation of the appended body 20 does not cause any torque to be applied to the main body 10. Thus, the orientation of the payload supported on the appended body 20 can be changed without transferring momentum to the main body 10 of the satellite. The gimbal 30 effectively decouples the momentum of the main body 10 from the momentum of the appended body 20.

Frictional forces at the bearings of the gimbal 30 cause torques to be applied to the main body 10 when the appended body 20 changes orientation. If the main body 10 is sufficiently more massive than the appended body 20, the effect of friction at the bearings of the gimbal 30 may be negligible. However, when the masses of the main body 10 and the appended body 20 do not differ too greatly, the effect of friction at the gimbal bearings may become significant. Usually, also, one or more electrical cables (not shown in the drawing) would extend from the main body 10 to the appended body 20 to carry electrical power and signals to the appended body 20. Depending upon the relative masses of the main body 10 and the appended body 20, stiffness in the electrical cable or cables might cause non-negligible torques to be applied to the main body 10 when the appended body 20 changes orientation.

An attitude sensor system 50, as shown schematically in FIG. 4 can be used to apply countertorques to the main body 10 in order to nullify the effect of any torques applied to the main body 10 due to frictional forces at the bearings of the gimbal 30 and/or stiffness of electrical cables extending from the main body 10 to the appended body 20.

The attitude sensor system 50 comprises a computer 51 for receiving a continuous input from the star tracker 11, which tracks two or more stars to enable the position and attitude of the main body 10 to be continuously monitored. An instrument gyro 52 capable of measuring three-axis inertial rotation rates, is also a component of the attitude sensor system 50. The gyro 52 senses deviations of the attitude of the main body 10 from a desired attitude, and provides input signals to the computer 51 indicative of such deviations. The computer 51 processes these input signals to provide output signals to the motors of the torquer-resolver units 31, 32 and 33 of the gimbal 30, which cause countertorques to be applied to the main body 10 to nullify the effect of the sensed deviations. The countertorques exactly balance the torques due to frictional forces at the gimbal bearings and/or stiffness of the electrical cables. Thus, the appended body 20 of a space satellite according to the present invention can be moved without imparting motion to the main body 10.

The present invention has been described above in terms of a preferred embodiment. However, variations in particular design features would be apparent to workers skilled in the art upon perusal of the above description and the accompaning drawing. Therefore, the foregoing description is to be understood as illustrative of the invention. However, the scope of the invention is not limited to any particular embodiment, but rather is defined by the following claims and their equivalents.

What is claimed is:

1. An agile payload orientation system for a space satellite, said system comprising gimbal means for appending a body containing said payload to a main body of said satellite, said appended body also containing momentum exchange means responsive to external command for changing the orientation of said appended body, said gimbal means including bearings that enable rotation of said appended body relative to said main body about three mutually orthogonal axes, said axes having a common point of intersection that coincides with the center of mass of said appended body, thereby enabling said appended body to be moved without imparting motion to said main body, said system further comprising an attitude sensor mounted on said main body for detecting incipient motion of said main body relative to an inertial reference due to torque caused by frictional forces at said gimbal bearings when said appended body undergoes rotation relative to said main body, said attitude sensor generating a signal indicative of said frictional forces at said gimbal bearings, said payload orientation system further comprising torquer-resolver means responsive to said signal generated by said attitude sensor so as to apply countertorque to said main body, said countertorque being opposite to said torque caused by said frictional forces at said gimbal bearings so that no substantial net torque is applied to said gimbal bearings.

2. The payload orientation system of claim 1 wherein said momentum exchange means comprises gyroscopic means containing at least three momentum wheels, the angular velocity of said momentum wheels being controllable by external command.

* * * * *